United States Patent Office 2,941,924
Patented June 21, 1960

2,941,924

MONOETHANOLAMINE SALT OF α-(ACETYL-AMINO)-ISOCAPROIC ACID

Paul Gailliot, Paris, Jean Baget, Ermont, and Bernard Beas, Paris, France, assignors to Societe des Usines Chimiques Rhone-Poulenc, Paris, France, a corporation of France No Drawing. Filed June 30, 1958, Ser. No. 745,292

Claims priority, application France Mar. 30, 1956

2 Claims. (Cl. 167—65)

This invention relates to a new compound having a therapeutic application and is a continuation-in-part of application Serial No. 639,232, filed February 11, 1957, now abandoned.

As a result of research and clinical experiments, it has been found that racemic and optically active α-(acetylamino)-isocaproic acids, as also their salts, possess a remarkable action on vertigo of various origins, such as Ménière's vertigo, and vertigo of irritative form or of toxic nature. They also possess hypotensive properties which can be used in therapy.

It is an object of the present invention to provide a new compound which, having the aforesaid activity in relation to vertigo is, at the same time of low toxicity.

According to the present invention there is provided the new compound which is the monoethanolamine salt of α-(acetylamino)-isocaproic acid. The invention further provides pharmaceutical compositions containing the said compound in a sterile diluent medium. The compound may be in the racemic form or in the form of an optical isomer.

The sterile diluent medium may be solid e.g. the compositions may be in the form of tablets or powders to be dissolved or suspended in a sterile vehicle, or may be liquid so that the compositions take the form of solutions or suspensions. Of the liquid diluents, the most preferred is sterile water, the compositions then being useful for parenteral injection.

The sterility of the compositions may be achieved by any convenient method, e.g. by heating at 100–130° C. or by filtration through a candle filter or other sterilising diaphragm.

The compositions of the invention may include compatible agents known per se for use in pharmaceutical practice. The percentage of active product in the compositions of the invention may vary within the limits which permit the administration of a suitable dose in a number of units which can be reasonably administered. Generally speaking, the preparations according to the present invention contain at least 1%, and preferably 5–25% of active substance (calculated as α-(acetylamino)-isocaproic acid).

The monoethanolamine salt of α-(acetylamino)-isocaproic acid has proved clinically active on vertigo of various origins, and more especially on post-traumatic vertigo, cephalalgia and muscular cramp. The normal dose employed for an adult is 100 mg. to 1 g. per day (calculated on the α-(acetylamino)-isocaproic acid) when the product is administered by the intramuscular method. When administered intravenously, the doses must be smaller.

As stated above the compound of this invention is of a different order of toxicity as compared with known amine salts of α-(acetylamino)-isocaproic acid. Thus Lure et al. Chemical Abstracts 47, p. 12246e mentions the piperidine quaternary salt of α-(acetylamino)-isocaproic acid (N-acetyl-leucine) and the following is a comparison of the toxicity of the compound of the present invention with the compound described by Lure. The two compounds are comparable in regard to their activity in combatting vertigo. To test the toxicity of the compounds mice, in batches of ten, were given intraperitoneal injections of aqueous solutions of the salts with the following results. (In the following table the doses are expressed in weight of α-(acetylamino)-isocaproic acid):

TABLE

| Piperdine salt | | Monoethanolamine salt | |
| --- | --- | --- | --- |
| Dose in g./kg. of mouse | Number dead (out of 10) after three days | Dose in g./kg. of mouse | Number dead (out of 10) after three days |
| 1,480 | 10 | 8,300 | 10 |
| 990 | 10 | 7,009 | 8 |
| 660 | 6 | 5,900 | 5 |
| 440 | 0 | 5,000 | 3 |

From the figures it can be calculated that the $LD_{50}$ value in g./kg. (i.e. the dose which will cause the death of 50% of the mice, expressed in weight of α-(acetylamino)-isocaproic acid) is 0.62 in the case of the piperidine salt and 5.82 in the case of the monoethanolamine salt, i.e. the latter has a toxicity level only about one-tenth that of the piperidine salt.

Hence the monoethanolamine salt characteristic of this invention has outstanding and unexpected value as a therapeutic substance for the clinical treatment of vertigo.

The following examples will serve to illustrate the invention:

Example I 1.24 g. of monoethanolamine is dissolved in 50 cc. of water, and 3.46 g. of α-(acetylamino)-isocaproic acid are then added with agitation. After dissolution, 0.1 g. of decolourising charcoal is added and the solution is filtered. The product is washed with 2 x 25 cc. of water, and the filtrate is subjected to lyophilisation. 4.4 g. of the monoethanolamine salt of α-(acetylamino)-isocaproic acid, melting at about 150° C., are obtained.

For use, this salt is dissolved in the proportion of 1 g. to 10 cc. of distilled water to give a 10% solution, which is distributed in ampoules, sealed and sterilised for 20 minutes at 120° C. The solution thus obtained is stable and substantially neutral.

Example II

A suspension of 34.6 g. of α-(acetylamino)-isocaproic acid in 70 cc. of distilled water is dissolved at 20° C. by adding 12.2 g. of monoethanolamine in 10 cc. of distilled water. 40 cc. of water are then driven off on the water bath under a pressure of 20 mm. Hg, 200 cc. of ethyl alcohol are then added with agitation. After agitation for 4 hours at +5° C., the mixture is filtered, washed with alcohol and dried in vacuo at 50° C.

28 g. of the monoethanolamine salt of α-(acetylamino)- isocaproic acid are obtained and an aqueous solution thereof is sterilised for use as set forth above.

We claim:
1. The monoethanolamine salt of α-acetylamino)-isocaproic acid.
2. A pharmaceutical composition consisting of the monoethanolamine salt of α-(acetylamino)-isocaproic acid in a sterile aqueous medium at a concentration of 5 to 25% calculated as α-(acetylamino)-isocaproic acid.

References Cited in the file of this patent
UNITED STATES PATENTS
2,596,631  Whitacre _____ May 13, 1952

OTHER REFERENCES
Overby et al.: J.A.C.S., vol. 73, pages 3364–69 (1951).
Lure et al.: Chem. Abst., vol. 47, page 12246 (1953).